(12) United States Patent
Chen et al.

(10) Patent No.: US 7,760,680 B2
(45) Date of Patent: Jul. 20, 2010

(54) PRIORITIZED COMMUNICATION BETWEEN BASE STATION AND MOBILE UNIT

(75) Inventors: Lan Chen, Yokohama (JP); Hidetoshi Kayama, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1259 days.

(21) Appl. No.: 10/307,448

(22) Filed: Dec. 2, 2002

(65) Prior Publication Data

US 2003/0103520 A1      Jun. 5, 2003

(30) Foreign Application Priority Data

Dec. 3, 2001     (JP)      ............................. 2001-369078

(51) Int. Cl.
  *H04W 4/00* (2009.01)
(52) U.S. Cl. ..................... 370/328; 370/348; 370/353; 455/452.2
(58) Field of Classification Search ................ 370/341, 370/353, 346, 363, 329, 351, 352, 350, 328, 370/252, 335, 342; 455/515, 505, 451, 455, 455/450, 445, 453, 452.1, 462
  See application file for complete search history.

(56) References Cited

U.S. PATENT DOCUMENTS

| | | | | |
|---|---|---|---|---|
| 5,521,925 | A * | 5/1996 | Merakos et al. | 370/337 |
| 5,729,542 | A * | 3/1998 | Dupont | 370/346 |
| 5,940,765 | A * | 8/1999 | Haartsen | 455/462 |
| 6,005,852 | A * | 12/1999 | Kokko et al. | 370/329 |
| 6,704,291 | B2 * | 3/2004 | Mueckenheim et al. | 370/252 |
| 6,731,602 | B1 * | 5/2004 | Watanabe et al. | 370/231 |

FOREIGN PATENT DOCUMENTS

| | | |
|---|---|---|
| CN | 1178044 | 4/1998 |
| EP | 0 831 669 | 3/1998 |
| EP | 0 831 669 A2 | 3/1998 |
| EP | 1 119 213 | 7/2001 |
| EP | 1 119 213 A1 | 7/2001 |
| JP | 2-117227 | 5/1990 |
| JP | 10-190565 | 7/1998 |
| JP | 10-191455 | 7/1998 |
| JP | 10-336734 | 12/1998 |
| JP | 11-017607 | 1/1999 |

(Continued)

*Primary Examiner*—Ian N Moore
(74) *Attorney, Agent, or Firm*—Oblon, Spivak, McClelland, Maier & Neustadt, L.L.P.

(57) ABSTRACT

In packet communications between a mobile terminal and a base station, the mobile terminal checks a priority level of a traffic and judges a type of the traffic, and transmits a reservation signal for a transmission request to the base station when the type of the traffic is a high priority level or realtime type, and does not transmits it when the type of the traffic is a low priority level or non-realtime type, while the base station determines a resource amount to be reserved for packet transmission according to a resource utilization state and the reservation signal for the traffic of the high priority level or realtime type, or an average transmission interval or transmission rate for the traffic of the low priority level or non-realtime type according to margins in remaining resources, and notifies the resource amount or the average transmission interval or transmission rate to the mobile terminal.

14 Claims, 8 Drawing Sheets

FOREIGN PATENT DOCUMENTS

| | | |
|---|---|---|
| JP | 11-266271 | 9/1999 |
| JP | 2000-224231 | 8/2000 |
| JP | 2001-217772 | 8/2001 |
| JP | 2001-313656 | 11/2001 |
| JP | 2002-521886 | 7/2002 |
| KR | 2000-0060797 | 10/2000 |
| WO | WO 00/42805 | 7/2000 |

\* cited by examiner

CORRESPONDENCE TABLE FOR
TRAFFIC TYPE, PRIORITY LEVEL & DSCP

| TRAFFIC TYPE | EF (EXPEDITED FORWARDING) | AF (ASSURED FORWARDING) | BE (BEST EFFORT) |
|---|---|---|---|
| DSCP | 101110 | XXXYY0 | 000000 |
| PRIORITY LEVEL | HIGHEST PRIORITY CLASS WITH HIGHEST QUALITY | SECOND HIGHEST PRIORITY CLASS NEXT TO EF | BEST EFFORT COMMON TO Diffserv NON-SUPPORTING ROUTER |
| REALTIME CHARACTERISTIC IN PRESENT INVENTION | REALTIME | AF4 IS REALTIME AF3, AF2 & AF1 ARE NON-REALTIME | NON-REALTIME |

FIG.7

DSCP OF AF CLASSES

| | CLASS 1 | CLASS 2 | CLASS 3 | CLASS 4 |
|---|---|---|---|---|
| 1 (LOW DISCARDING PRIORITY LEVEL) | 001010 | 010010 | 011010 | 100010 |
| 2 (MEDIUM DISCARDING PRIORITY LEVEL) | 001100 | 010100 | 011100 | 100100 |
| 3 (HIGH DISCARDING PRIORITY LEVEL) | 001110 | 010110 | 011110 | 100110 |

FIG.8 EXEMPLARY CASE OF DETERMINING QoS OF REALTIME TRAFFIC & PACKET AVERAGE TRANSMISSION INTERVAL OR NUMBER OF PACKETS TO BE TRANSMITTED PER FRAME FOR NON-REALTIME TRAFFIC

| RESOURCE AVAILABILITY COEFFICIENT (RATE OF VACANT RESOURCES WITH RESPECT TO WHOLE) ACCOUNTING FOR INTERFERENCES FROM OTHER CELLS | QoS OF REALTIME TRAFFIC (e.g. TRANSMISSION RATE) | AVERAGE TRANSMISSION INTERVAL (IN SLOT UNITS) OR NUMBER OF PACKETS TO BE TRANSMITTED PER FRAME FOR NON-REALTIME TRAFFIC | | | |
|---|---|---|---|---|---|
| | | AF3 | AF2 | AF1 | BE |
| 0.7–1.0 | EF, AF4 MAXIMUM TRANSMISSION REQUEST | 3/10 | 6/5 | 9/3 | 12/2 |
| 0.3–0.7 | AVERAGE TRANSMISSION REQUEST BETWEEN MAXIMUM & MINIMUM | 5/6 | 10/3 | 15/2 | 20/1 |
| 0–0.3 | MINIMUM TRANSMISSION REQUEST | 7/4 | 14/2 | 21/1 | 28/0 |

PRIORITIZED COMMUNICATION BETWEEN BASE STATION AND MOBILE UNIT

BACKGROUND OF THE INVENTION

1. Field of the Invention

The present invention relates to a communication control system, a communication control method, a base station device and a mobile terminal device for carrying out packet communications between the base station device and the mobile terminal device.

2. Description of the Related Art

Conventionally, there are two types of the uplink resource control or traffic control method in the mobile packet communications including a resource reserving type method and a resource non-reserving type method.

Exemplary techniques for this resource reservation includes those disclosed in Japanese Patent Application No. 9-180261 (1997) and Japanese Patent Application Laid Open No. 10-191455 (1998), and these examples use the resource reserving type method for reserving resources according to a reservation from a mobile terminal regardless of types of traffics.

On the other hand, as the resource non-reserving type method, PRMA (Packet Reservation Multiple Access) type access control methods have been proposed. One example of them as disclosed in Japanese Patent Application Laid Open No. 10-136021 (1998) proposes a scheme for controlling the transmission of a reservation request packet by establishing a certain transmission permission as notified from a base station. According to this scheme, when the transmission of the reservation request packet succeeds, the same time-slot of the subsequent frames is also reserved for that mobile terminal, and the time-slot is released after the bursty communications are finished. Also, each mobile station adjusts the transmission permission establishing according to attributes such as its own priority level.

However, the above described resource reserving type method is associated with problems of low resource utilization efficiency including a problem that a reservation delay due to the resource reservation processing occurs for packets in small sizes and a problem that a control overhead becomes large as a rate of reservation signals becomes large. Also, there are cases where the actually used resources are less than the reserved resources due to a variation in the amount of occurred traffics, and in such cases the resources are reserved wastefully so that the resource utilization efficiency is lowered.

Also, the above described resource non-reserving type method has a drawback that the QoS satisfaction level is lowered at the beginning of the burst in the realtime traffic as the quality degradation such as delay or interruption at a time of the start of the burst occurs due to the fact that the transmission of the initial packet is managed by the transmission permission establishing. Also, when there is temporarily no transmission packet during a communication session, the reservation will be released so that there is a possibility of becoming impossible to make the reservation for some time due to a variation of the transmission permission establishing when a next burst occurs, and this situation tends to cause a forceful disconnection of the realtime communication so that it can potentially be a factor for the service quality degradation.

BRIEF SUMMARY OF THE INVENTION

It is therefore an object of the present invention to provide a communication control system and a communication control method capable of realizing the efficient resource utilization, securing the QoS, and improving the service quality, by changing a scheme for allocating resources according to whether it is a realtime traffic or a non-realtime traffic.

According to one aspect of the present invention there is provided a communication control method for mobile communications in which packet communications are carried out between a mobile terminal and a base station, comprising the steps of: (a) checking a priority level of a traffic and judging a type of the traffic, at the mobile terminal; (b) transmitting a reservation signal for a transmission request to the base station when the type of the traffic is a high priority level or realtime type, and not transmitting the reservation signal to the base station when the type of the traffic is a low priority level or non-realtime type, at the mobile terminal; (c) determining a resource amount to be reserved for packet transmission according to a resource utilization state and the reservation signal for the traffic of the high priority level or realtime type, or determining an average transmission interval or transmission rate for the traffic of the low priority level or non-realtime type according to margins in remaining resources, at the base station; and (d) notifying the resource amount or the average transmission interval or transmission rate determined by the step (c) from the base station to the mobile terminal.

According to another aspect of the present invention there is provided a communication control system for mobile communications in which packet communications are carried out between a mobile terminal and a base station, comprising: a priority level checking unit for checking a priority level of a traffic and judging a type of the traffic, at the mobile terminal; a reservation signal generation unit for transmitting a reservation signal for a transmission request to the base station when the type of the traffic is a high priority level or realtime type, and not transmitting the reservation signal to the base station when the type of the traffic is a low priority level or non-realtime type, at the mobile terminal; a resource determination unit for determining a resource amount to be reserved for packet transmission according to a resource utilization state and the reservation signal for the traffic of the high priority level or realtime type, or determining an average transmission interval or transmission rate for the traffic of the low priority level or non-realtime type according to margins in remaining resources, at the base station; and a notification information control unit for notifying the resource amount or the average transmission interval or transmission rate determined by the resource determination unit from the base station to the mobile terminal.

According to another aspect of the present invention there is provided a base station device for carrying out packet communications with a mobile terminal, comprising: a reservation signal receiving unit for receiving a reservation signal for a transmission request when a type of a traffic is a high priority level or realtime type; a resource determination unit for determining a resource amount to be reserved for packet transmission according to a resource utilization state and the reservation signal for the traffic of the high priority level or realtime type, or determining an average transmission interval or transmission rate for a traffic of a low priority level or non-realtime type according to margins in remaining resources; and a notification information control unit for notifying the resource amount or the average transmission interval or transmission rate determined by the resource determination unit to the mobile terminal.

According to another aspect of the present invention there is provided a mobile terminal device for carrying out packet communications with a base station, comprising: a priority level checking unit for checking a priority level of a traffic and judging a type of the traffic; and a reservation signal generation unit for transmitting a reservation signal for a transmission request to the base station when the type of the traffic is a high priority level or realtime type, and not transmitting the reservation signal to the base station when the type of the traffic is a low priority level or non-realtime type.

Other features and advantages of the present invention will become apparent from the following description taken in conjunction with the accompanying drawings.

DETAILED DESCRIPTION OF THE INVENTION

Referring now to FIG. 1 to FIG. 8, one embodiment of a communication control system and a communication control method according to the present invention will be described in detail.

(Communication Control Method)

Figure 1:
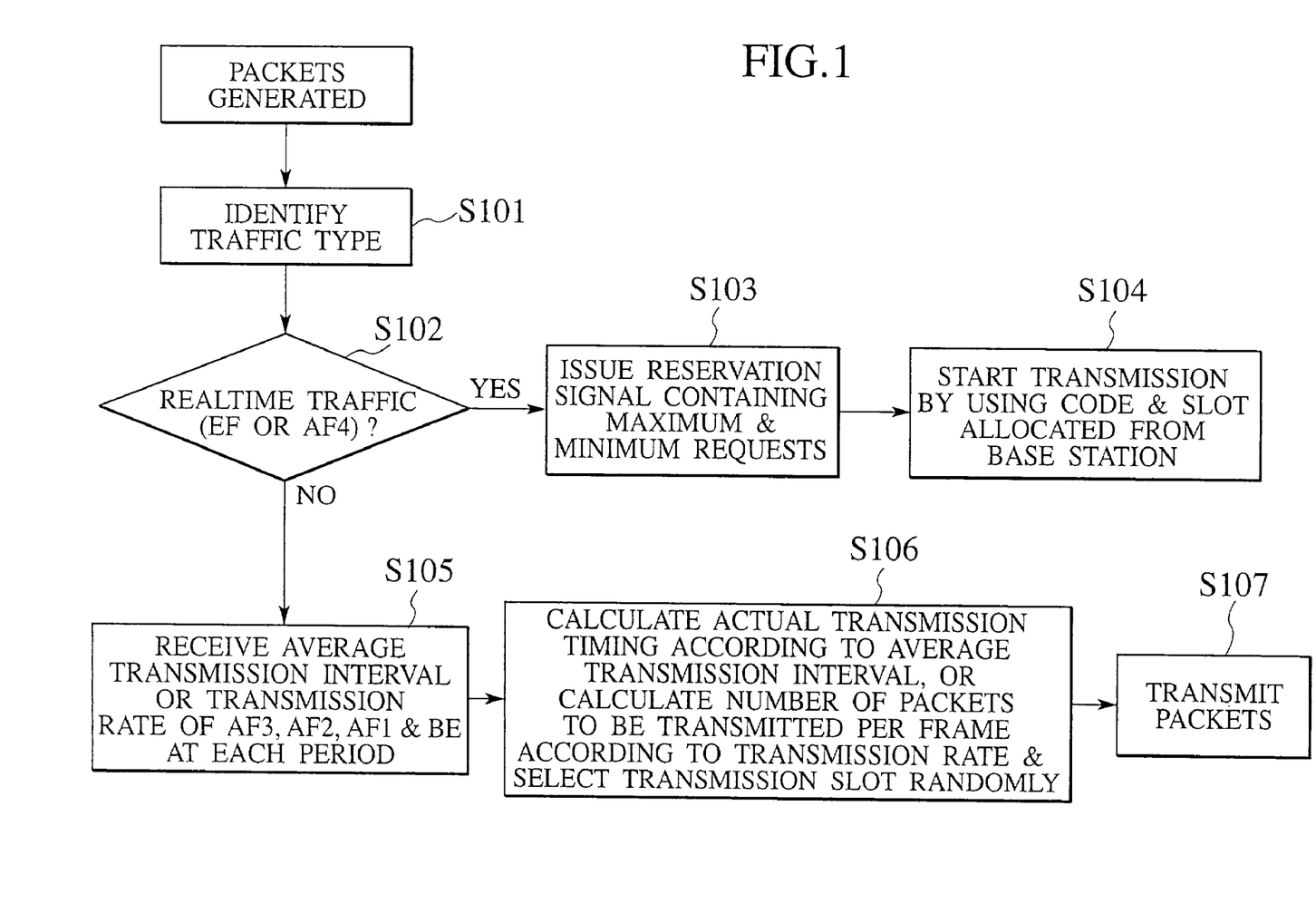
FIG. 1 is a flow chart showing an operation of a mobile terminal according to one embodiment of the present invention.
Figure 2:
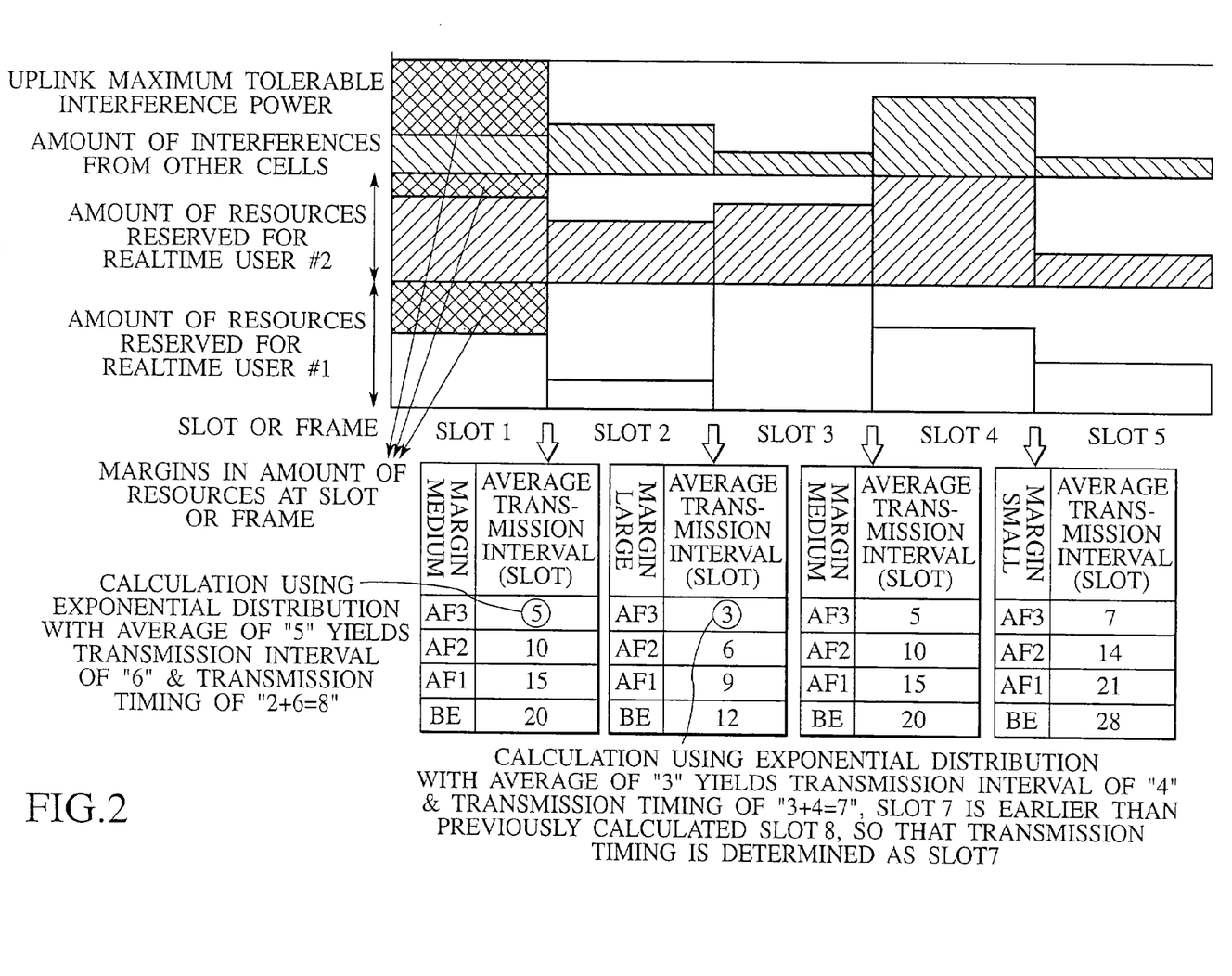
FIG. 2 is a diagram for explaining an operation to determine an average transmission interval for the non-realtime traffic after reserving resources for the realtime traffic according to one embodiment of the present invention.
Figure 3:
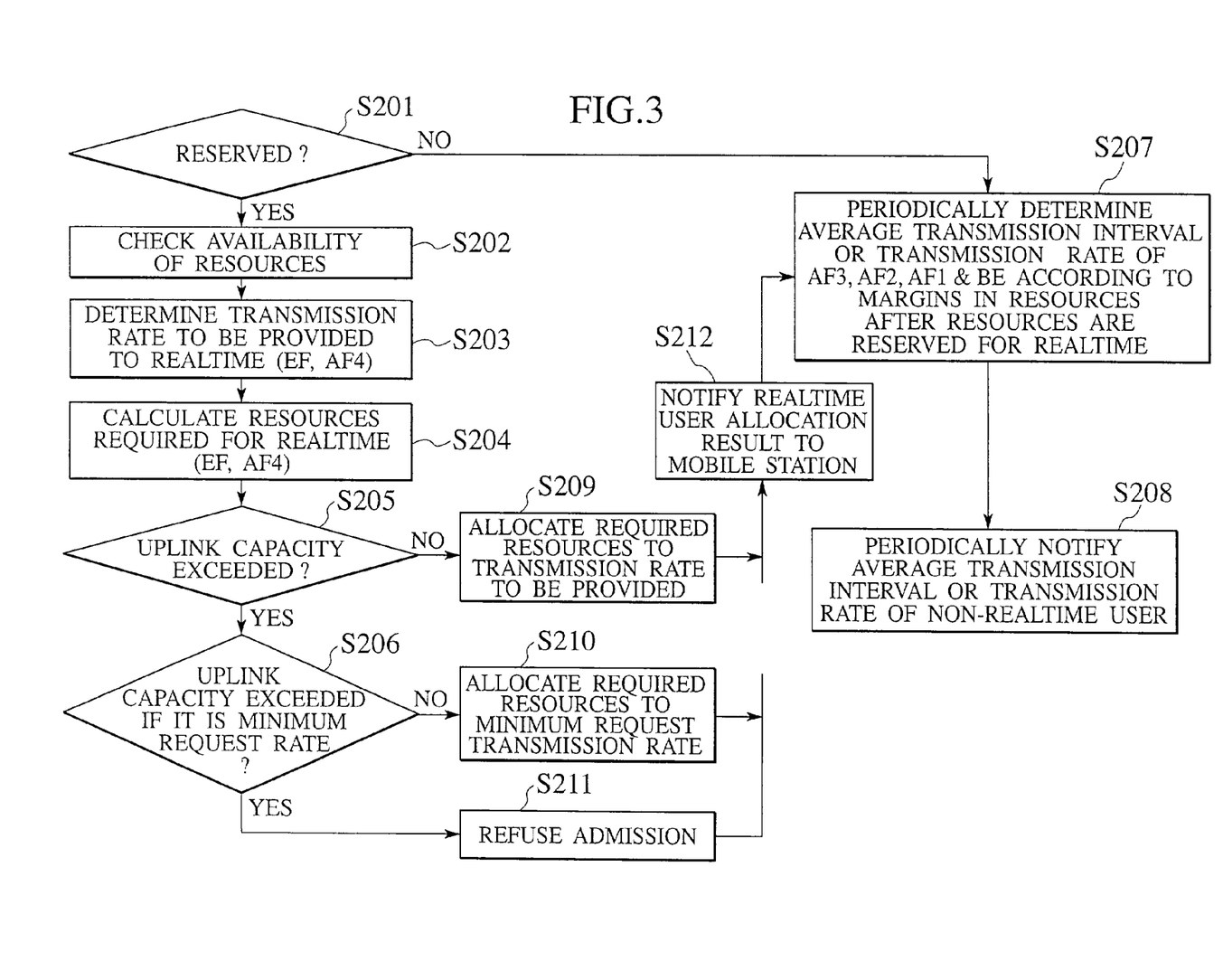
FIG. 3 is a flow chart showing an operation of a base station according to one embodiment of the present invention.

FIG. 1 to FIG. 3 show the procedure of the communication control method according to this embodiment.

The communication control method according to this embodiment has the major features that, in the mobile communications for carrying out packet communications between a mobile terminal and a base station, a priority level of an application traffic is checked and a type of that traffic is judged at the mobile terminal side, and when that traffic is a traffic of a high priority level or of a realtime type, a transmission request reservation signal is transmitted to the base station, whereas when that traffic is of a low priority level or of a non-realtime type, the reservation signal is not transmitted, while the base station determines an amount of resources to be reserved for the realtime packet transmission according to presence or absence of that reservation signal and in the case of the low priority level or the non-realtime type, the base station determines not to reserve any resources while determining an average transmission interval of the packets and notifies this determination to the mobile terminal side.

In the priority level checking method of this embodiment, assuming Diffserv control, the priority level and the realtime characteristic of the IP packets are judged by DSCP (Diffserv Code Point). Here, the Diffserv control is a QoS control on the Internet or the like, in which the priority level is specified by each IP packet header and the priority control is carried out for each packet at each router, and its implementation is the standard for a network communication device in a form of a router. Namely, in this control, the header fields of the IP packet include a Diffserv field, and 6 bits of this field indicate a Diffserv Code Point (DSCP) of the packet.

Figure 6:
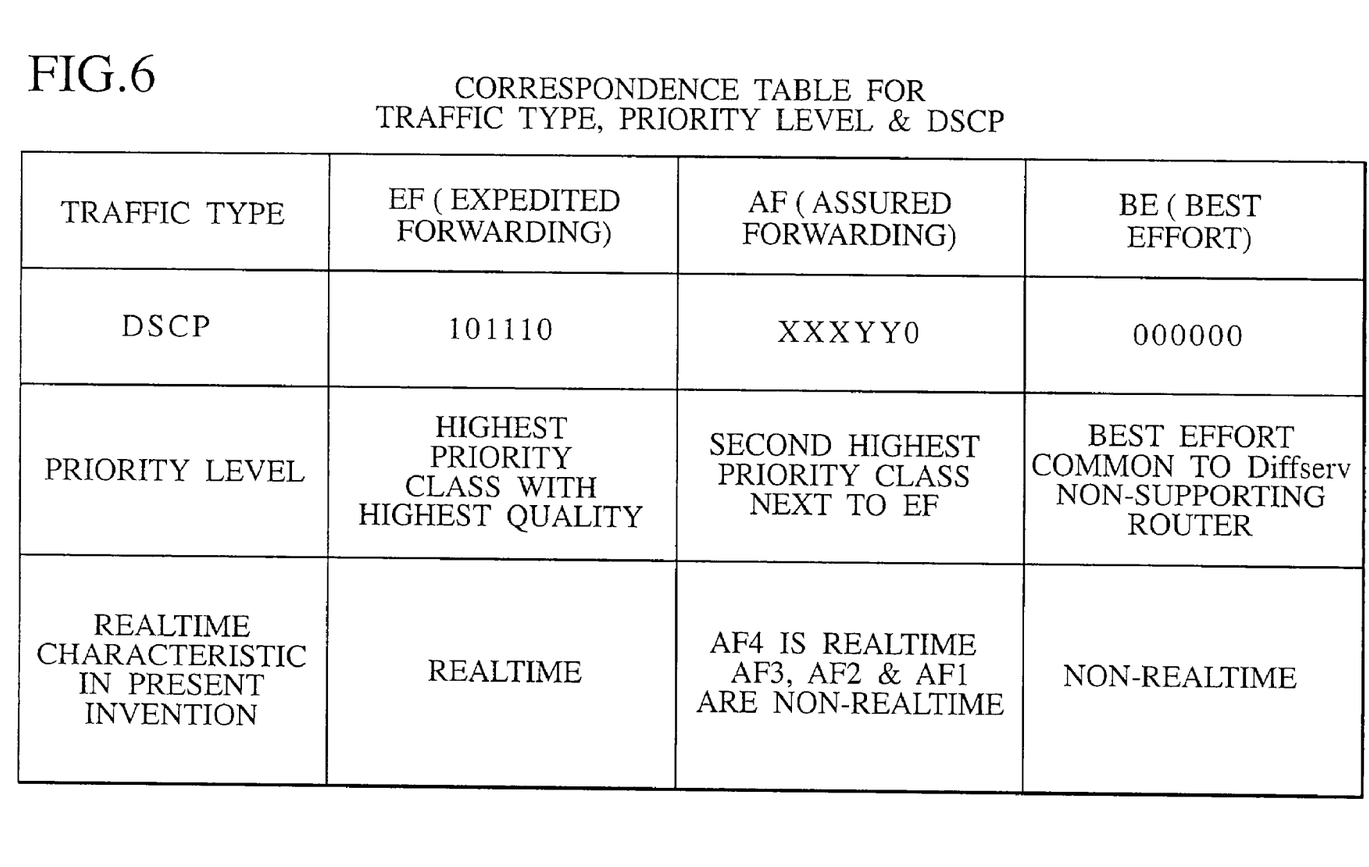
FIG. 6 is a diagram showing a correspondence table for traffic type, priority level and DSCP according to one embodiment of the present invention.

FIG. 6 shows a correspondence relationship between the traffic type or the priority level and the DSCP.

Figure 7:
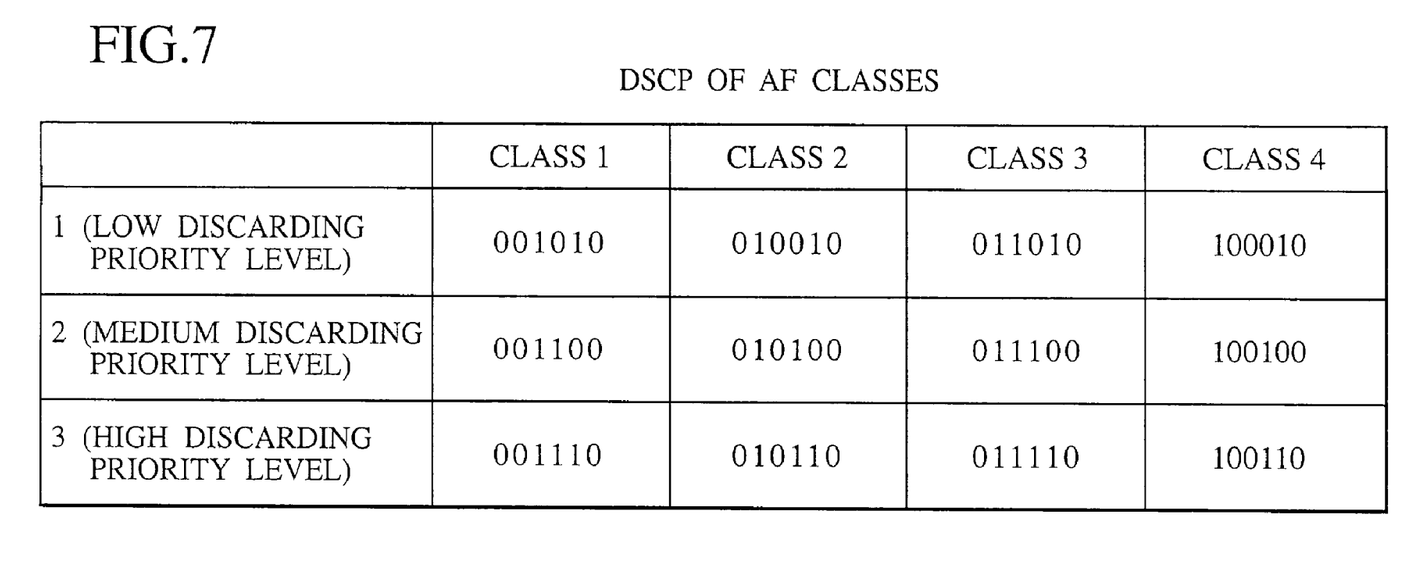
FIG. 7 is a diagram showing a table of DSCP of AF classes according to one embodiment of the present invention.

Within an AF (Assured Forwarding) class shown in FIG. 6, four classes and three stages of the discarding priority levels are defined further. FIG. 7 shows DSCPs of the AF classes.

In this embodiment, EF and AF4 are regarded as the realtime traffics while AF3, AF2, AF1 and BE are regarded as the non-realtime traffics. Note that, according to the requests of the applications such as those for delays, it is also possible to use an alternative mapping in which EF is regarded as the realtime traffic while AF4, AF3, AF2, AF1 and BE are regarded as the non-realtime traffics.

Note that this embodiment is directed to the case of one-to-one correspondence between the DSCP and the QoS, but it is also possible to use different QoS mappings for the same DSCP according to the desire of the user. In such a case, the desire of the user should be given a higher priority. For example, in the case where three ranks of high, medium and low are available for the image quality of the video phone, they can be set in correspondence to AF4, AF3 and AF2, respectively. At the system side, such three ranks of the image quality are notified to the user in advance, such that the user makes a selection before carrying out communications. When there is no user selection, it is mapped to AF4.

Next, the specific procedure of the communication control method according to this embodiment will be described. FIG. 1 shows an operation of the mobile terminal in this embodiment. As shown in FIG. 1, when the transmission packets are generated, the mobile terminal carries out the identification of the traffic type first (S101, S102). More specifically, the DSCP of the packets is recognized and whether it is realtime or non-realtime is judged.

In the case where it is judged as a realtime traffic at the step S102, a reservation packet containing the QoS request (a maximum request, an average request, or a minimum request, for example) specified from the user is transmitted (S103), and the resource allocation by the base station is waited. After that, the transmission of the packets using a code and a slot allocated by the base station is carried out (S104).

On the other hand, in the case where it is judged as a non-realtime traffic at the step S102, a packet average transmission interval or transmission rate of that traffic type (AF3, AF2, AF1, BE) as notified from the base station for that frame is received (S105), and the actual transmission timing of the packet is calculated (S106). This embodiment uses an exemplary calculation method in which the actual packet transmission interval is calculated according to the exponential distribution with an average set equal to the average transmission interval notified from the base station.

In further detail, as shown in FIG. 2, in the case where the average transmission interval is notified from the base station, the uplink interference power level in the previous slot or the average of the uplink interference powers in the previous frame is measured, and the average transmission interval of each traffic type in the next slot or frame is notified from the base station according to margins in the resources. Each mobile terminal calculates the packet transmission interval for the traffic type of the own device according to the notified information.

Also, the mobile terminal receives the average transmission interval of each traffic type that is periodically notified from the base station, and adjusts the average transmission timing according to the latest average transmission interval. For example, as shown in FIG. 2, the user of AF3 checks the average transmission interval (5 slots) at a time of the slot2, and determines the actual transmission timing according to the exponential distribution.

In the example shown in FIG. 2, the calculation is made by setting the actual transmission interval equal to 6 slots. Consequently, it will be transmitted at the slot8 that is 6 slots ahead from the slot2. At a timing of the slot3, when the transmission interval calculated according to the exponential distribution with the average of 3 slots is 4 slots, for example, the transmission slot becomes the slot7 (3+4=7). Here, this "7" is compared with the transmission timing "8" calculated in the previous slot, and one with the earlier timing (slot7) is selected as the transmission timing. In this way, the transmission timing is calculated at each slot on a basis of the latest notified average transmission interval, compared with the transmission timing calculated in the previous slot, and one with the earlier transmission time is selected as the transmission timing. Consequently, it is possible to deal with the variation of the traffic load quickly, and it is possible to utilize the resources efficiently.

Then, the packet transmission is carried out at the calculated transmission timing (S107). Note that this embodiment is directed to the exemplary case where the average transmission interval notifying period and the transmission timing calculation period are set equal to one slot, but it is also possible to set them equal to one frame.

Also, in the case where the base station notifies the transmission rate, each mobile terminal checks the transmission rate corresponding to the priority level or the traffic type of the own device, and determines the number of packets to be transmitted per unit time. For example, when the transmission rate of the AF3 traffic is notified as 320 kbps, if the frame length is 10 ms and the packet size is 320 bits, the number of packets to be transmitted per frame is 10. Also, if the number of slots per frame is 15, these 10 transmission packets are transmitted by randomly selecting 10 slots from these 15 slots.

FIG. 3 shows an operation of the base station. As shown in FIG. 3, when the base station receives the reservation packet (containing the QoS request) for the realtime traffic from the mobile terminal (S201), the availability of the resources is checked (S202). More specifically, in this embodiment, the QoS request from the user is set as the transmission rate. The availability of the resources is indicated by a rate of the average of the uplink interference powers of the slots in the previous frame with respect to the uplink maximum tolerable power, for example. The uplink interference powers contain interferences from the other cells.

Figure 8:
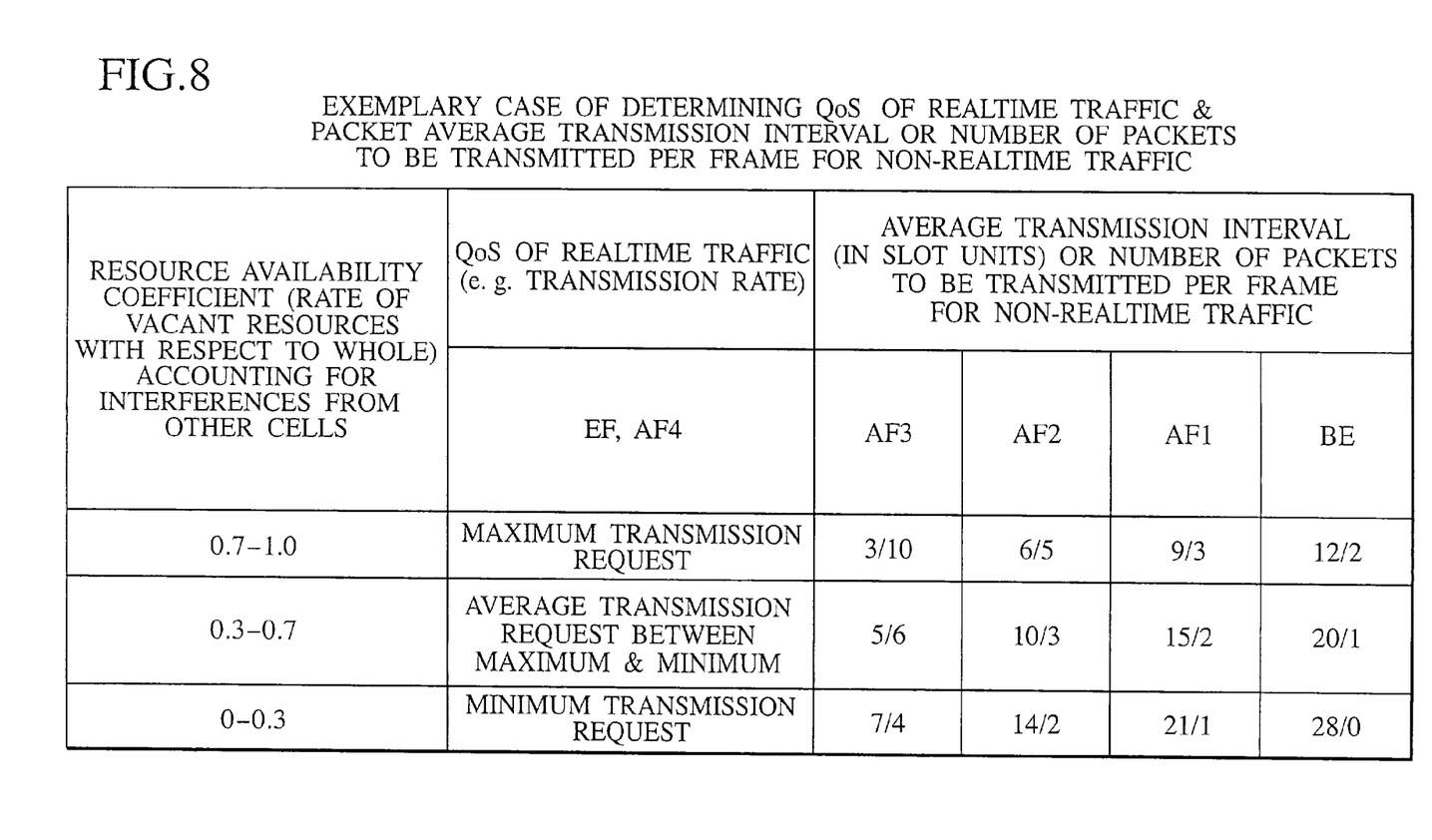
FIG. 8 is a diagram showing an exemplary case of determining a QoS of realtime traffic and a packet average transmission interval or a number of packets to be transmitted per frame for non-realtime traffic according to one embodiment of the present invention.

Next, the QoS (transmission rate) to be provided to the realtime traffic (EF, AF4) is determined (S203). For example, as shown in FIG. 8, when the resource availability coefficient is between 0.7 and 1.0, many resources are available so that it is determined to provide the maximum transmission rate of the user. Also, when the resource availability coefficient is between 0 to 0.3, not many resources are available so that it is determined to provide the minimum transmission rate of the user. This is an exemplary case where the maximum request and the minimum request for the QoS are declared by the mobile terminal at a time of the reservation, but in the case where the maximum request and the minimum request of the QoS are not declared, it is possible for the base station to set several steps such as high, medium and low.

The transmission rate can be adjusted by the value of the spreading factor (SF) or the multi-code number to be used for each user. In the case of doubling the transmission rate, a provision for reducing the SF to a half and a provision for using twice as many orthogonal codes will require the same amount of the required power resource, so that the exemplary case of adjusting the transmission rate by the number of orthogonal codes to be used will be described here.

Next, the amount of resources required for providing the determined transmission rate is calculated (S204). In the case of carrying out the transmission power control in the CDMA, the transmission power is controlled such that the SIR (Signal-to-Interference Ratio) becomes a target SIR (which will be denoted as "SIRtg"). The amount of the uplink interferences as seen from the base station will be denoted as "Sumliup". The receiving power necessary at the base station in order to provide the transmission rate of "ratecd" by one code is calculated by the following equation (1).

$$\text{Powercd} = SIRtg \times Sumliup \tag{1}$$

The receiving power necessary at the base station in order to provide the determined transmission rate "rateqos" is calculated by the following equation (2).

$$Powerqos = Powercd \times rateqos / ratecd \tag{2}$$
$$= SIRtg \times Sumliup \times ratequos / ratecd$$

Then, whether the calculated resource amount exceeds the uplink capacity or not is judged (S205).

In the case where the uplink capacity is not exceeded even when the calculated "Powerqos" is added to the current average uplink interference power, the transmission rate and the number of codes (rateqos/ratecd) for providing "rateqos" are allocated (S209), and notified to the mobile terminal (S212).

On the other hand, in the case where the uplink capacity is exceeded when the calculated "Powerqos" is added to the current average uplink interference power, "rateqos" is reduced to the minimum request "ratemin", and "Powermin" is re-calculated by using the following equation (3).

$$Powermin = Powercd \times ratemin / ratecd \tag{3}$$
$$= SIRtg \times Sumliup \times ratemin / ratecd$$

Then, whether the uplink capacity is exceeded or not is judged by using this re-calculated value (S206), and if it is not exceeded, the resources required for the minimum request transmission rate are allocated (S210) and notified to the mobile terminal (S212). If it is judged that the uplink capacity is exceeded at the step S206, the admission is refused (S211).

The packet average transmission intervals or the transmission rates for AF3, AF2, AF1 and BE are determined according to the margins of the resources after the allocation of the resources to EF and AF4 as indicated in FIG. 8 (S207), and notified to the mobile terminal by using the notification signal (S208). For example, when the traffics are heavy (when the availability coefficient is between 0 to 0.3), the average transmission intervals of AF3, AF2, AF1 and BE traffics are set to be "12", "24", "36" and "48", respectively, and notified to the mobile terminal.

Note that the mobile terminal determines the actual transmission timing according to the exponential distribution with the average value equal to the notified average transmission interval of that traffic type. For example, even in the case where a plurality of mobile terminals of the BE traffic exist, each one determines the actual transmission timing according to the exponential distribution with the average of "48", so that it is possible to reduce collisions in the uplink.

Also, as for the decision of the resource allocation at the steps S209 and S210, it is decided when the transmission request is made in the case of the realtime traffic, whereas it is decided and notified according to the latest traffic state by setting a certain period (one slot interval or one frame interval, for example) as the average transmission interval in the case of the non-realtime traffic.

Note that the exponential distribution is used in this embodiment, but it is also possible to use the other distribution with the average value set equal to the average transmission interval value.

In the above, the operation in the case where the base station notifies the average transmission interval has been described, but in the case of notifying the transmission rate, each mobile terminal checks the transmission rate corresponding to the priority level or the traffic type of the own device, determines the number of packets to be transmitted per unit time, and transmits the packets by selecting slots randomly.

(Configuration of the Communication Control System)

Figure 4:
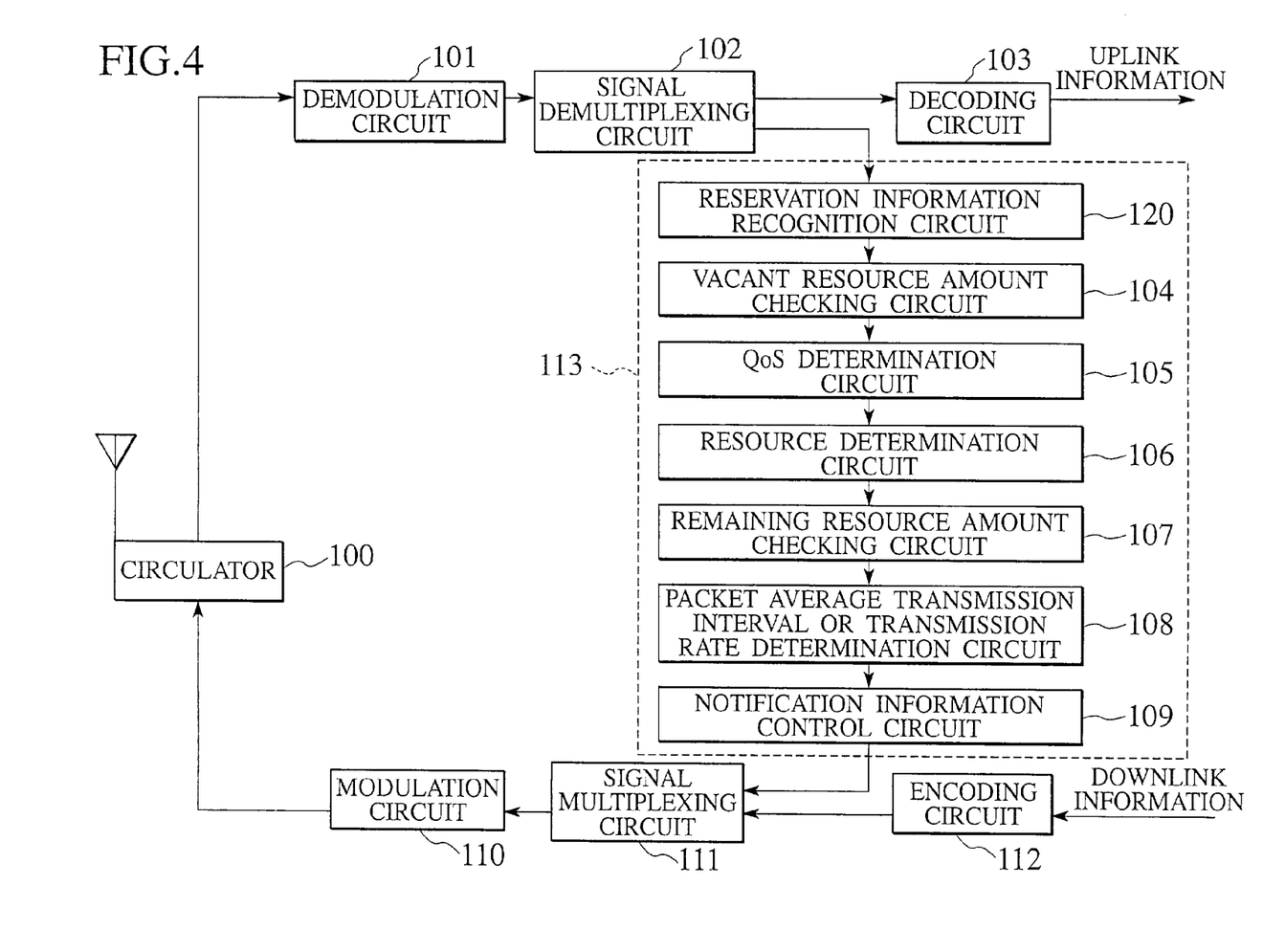
FIG. 4 is a block diagram showing a configuration of a base station according to one embodiment of the present invention.
Figure 5:
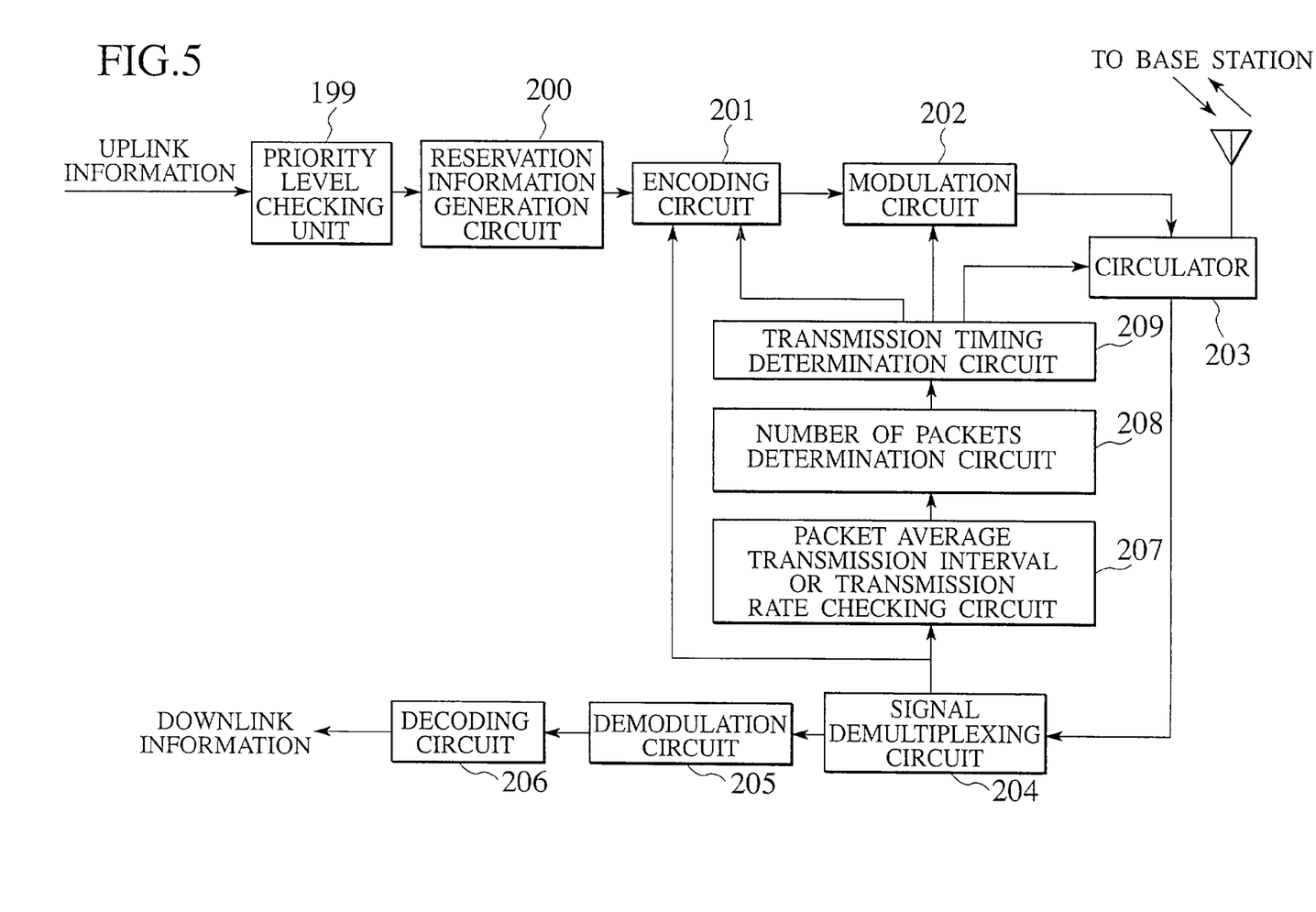
FIG. 5 is a block diagram showing a configuration of a mobile terminal according to one embodiment of the present invention.

The communication control method described above can be realized by the following communication control system. FIG. 4 and FIG. 5 show a configuration of the communication control system according to this embodiment.

As shown in FIG. 4, the base station has a circulator 100, a demodulation circuit 101, a signal demultiplexing circuit 102, a decoding circuit 103, a modulation circuit 110, a signal multiplexing circuit 111, an encoding circuit 112, and a resource determination unit 113.

The circulator 100 carries out transmission and reception of packets through radio communications with the mobile terminal, and the received uplink packets are outputted to the demodulation circuit 101 while the downlink packets modulated by the modulation circuit 110 are inputted from the modulation circuit 110 and transmitted to the mobile terminal.

The demodulation circuit 101 converts the received signals by a despreading processing or the like, and the converted signals are outputted to the signal demultiplexing circuit 102. The signal demultiplexing circuit 102 is a circuit for demultiplexing prescribed signals from the converted signals, and in this embodiment, the control signal such as the reservation signal is demultiplexed and outputted to the resource determination unit 113. Also, the signal demultiplexing circuit 102 outputs the signals after demultiplexing the reservation signal to the decoding circuit 103. The decoding circuit 103 decodes the inputted signals and outputs them as the uplink information to circuits of the subsequent stage.

On the other hand, the encoding circuit 112 encodes the downlink information, and the encoded signals are outputted to the signal multiplexing circuit 111. The signal multiplexing circuit 111 is a circuit for multiplexing the signals inputted from the encoding circuit 112 and the notification information inputted from the resource determination unit 113, assembling packets, and outputting them to the modulation circuit 110. The modulation circuit 110 modulates the multiplexed data and outputs them to the circulator 100.

The resource determination unit 113 has a reservation information recognition circuit 120, a vacant resource amount checking circuit 104, a QoS determination circuit 105, a resource determination circuit 106, a remaining resource amount checking circuit 107, a packet average transmission interval or transmission rate determination circuit 108, and a notification information control circuit 109.

The reservation information recognition circuit 120 is a circuit for recognizing the reservation signal among the control signals demultiplexed by the signal demultiplexing circuit 102 and analyzing its content. More specifically, the content of the reservation signal is analyzed and whether the traffic requested by the mobile terminal is realtime or non-realtime is judged.

The vacant resource amount checking circuit 104 is a circuit for checking the amount of currently used resources, judging the vacant resources, and outputting that judgement result to the QoS determination circuit 105. The QoS determination circuit 105 is a circuit for judging the priority level of the service request of the user according to the content of the reservation signal.

The resource determination circuit 106 is a circuit for determining the resource amount according to the checking result of the vacant resource amount checking circuit 104 in the case where the traffic requested from the mobile terminal is realtime.

The remaining resource amount checking circuit 107 is a circuit for subtracting the resource amount allocated to the realtime traffic from the vacant resource amount to check the remaining resource amount.

The packet average transmission interval or transmission rate determination circuit 108 is a circuit for determining the average transmission interval according to the priority level of the request from the mobile terminal in the case where the traffic requested by the mobile terminal is non-realtime.

The notification information control circuit 109 is a circuit for notifying the determined resource amount and average transmission interval to the mobile terminal, which outputs these informations to the signal multiplexing circuit 111.

Note that the signal demultiplexing circuit 102, the reservation information recognition circuit 120, the vacant resource amount checking circuit 104, the QoS determination circuit 105, the resource determination circuit 106, the remaining resource amount checking circuit 107, the packet average transmission interval or transmission rate determination circuit 108 and the notification information control circuit 109 may be provided behind the decoding circuit 103. Also, the signal multiplexing circuit 111 may be provided in front of the encoding circuit 112.

Then, in the base station in such a configuration, the reservation packet transmitted from the mobile terminal is recognized by the reservation information recognition circuit 120 through the circulator 100, the demodulation circuit 101, and the signal demultiplexing circuit 102. According to this recognized reservation packet, the vacant resource amount accounting for the interferences of the other cells is checked at the vacant resource amount checking circuit 104, and the QoS to be provided is determined by the QoS determination circuit 105.

After that, the amount of resources to be reserved for the realtime is calculated and allocated by the resource determination circuit 106. The remaining resource amount by subtracting the resources reserved for the realtime is checked by the remaining resource amount checking circuit 107. The packet average transmission interval or transmission rate for each priority level of the non-realtime is determined by the packet average transmission interval or transmission rate determination circuit 108, and after multiplexing the notification information from the notification information control circuit 109 with the downlink information at the signal multiplexing circuit 111, they are transmitted to the mobile terminal through the modulation circuit 110 and the circulator 100.

As shown in FIG. 5, the mobile terminal has a priority level checking unit 199, a reservation information generation circuit 200, an encoding circuit 201, a modulation circuit 202, a circulator 203, a signal demultiplexing circuit 204, a demodulation circuit 205, a decoding circuit 206, a packet average transmission interval or transmission rate checking circuit 207, a number of packets determination circuit 208, and a transmission timing determination circuit 209.

The circulator 203 carries out transmission and reception of packets through radio communications with the base station, and the received downlink packets are outputted to the signal demultiplexing circuit 204 while the uplink packets modulated by the modulation circuit 202 are inputted from the modulation circuit 202 and transmitted to the base station.

The signal demultiplexing circuit 204 is a circuit for demultiplexing prescribed signals from the signals inputted from the circulator 203, and in this embodiment, the control signal containing information regarding the QoS and the radio resource amount (notification information) is demultiplexed and outputted to the packet average transmission interval or transmission rate checking circuit 207. Also, the signal demultiplexing circuit 204 outputs the signals after demultiplexing the control signal to the demodulation circuit 205. The demodulation circuit 205 converts the received signals by a despreading processing or the like, and the converted signals are outputted to the decoding circuit 206. The decoding circuit 206 decodes the inputted signals and outputs them as the downlink information to circuits of the subsequent stage.

On the other hand, the encoding circuit 201 encodes the uplink information, and the encoded signals are outputted to the modulation circuit 202. The modulation circuit 202 modulates the encoded data and outputs them to the circulator 203.

The priority level checking unit 199 is a circuit for checking the transmission type traffic type (a value of the DSCP, for example), and judging whether it is the realtime traffic or the non-realtime traffic according to FIG. 6 described above. The judgement result of this priority level checking unit 199 is outputted to the reservation information generation circuit 200.

The reservation information generation circuit 200 is a circuit for generating the reservation signal according to the judgement result of the priority level checking unit 199, and outputting it to the encoding circuit 201. More specifically, the reservation information generation circuit 200 generates the reservation information in the case of the realtime traffic such as EF and AF4 as indicated in FIG. 6.

The packet average transmission interval or transmission rate checking circuit 207 checks the packet average transmission interval or transmission rate according to the notification information (information regarding the QoS and the radio resource amount) demultiplexed by the signal demultiplexing circuit 204, and outputs this checking result to the number of packets determination circuit 208. The number of packets determination circuit 208 determines the number of packets to be transmitted per unit time according to the packet average transmission interval or transmission rate, and outputs the determined number of packets to the transmission timing calculation circuit 209.

The transmission timing calculation circuit 209 calculates the transmission timing according to the number of packets to be transmitted per unit time and outputs the calculated transmission timing to the encoding circuit 201, the modulation circuit 202 and the circulator 203. The encoding circuit 201, the modulation circuit 202 and the circulator 203 encode and modulate the packets and transmit them to the base station at the inputted transmission timing.

In the mobile terminal in such a configuration, at a time of transmitting, the transmission target traffic type is checked by the priority level checking unit 199, and in the case of the realtime traffic, the reservation information is generated by the reservation information generation circuit 200, and this reservation information is transmitted to the base station through the encoding circuit 201, the modulation circuit 202 and the circulator 203.

On the other hand, at a time of receiving, the notification information regarding the QoS and the radio resource amount determined by the base station is received through the circulator 203 and the signal demultiplexing circuit 204.

Then, in the case of the realtime traffic, the mobile terminal transmits the packet data by using the allocated resource amount through the encoding circuit 201, the modulation circuit 202 and the circulator 203.

Also, in the case of the non-realtime traffic, the packet average transmission interval or transmission rate demultiplexed by the signal demultiplexing circuit 204 is checked at the packet average transmission interval or transmission rate checking circuit 207, the transmission timing is calculated at the transmission timing determination circuit 209, and the packet data are transmitted to the base station through the encoding circuit 201, the modulation circuit 202 and the circulator 203 at the determined transmission timing.

As described, according to the present invention, with respect to the realtime traffic, the resources are reserved and the base station allocates the resources according to the resource utilization state and the QoS request of the user, so that it is possible to realize the QoS support and the service quality improvement. On the other hand, with respect to the non-realtime traffic, the resources are not reserved and the packet reservation is unnecessary, so that the delay due to the reservation packet can be reduced by omitting the reservation packet. Also, the average transmission interval is determined dynamically according to the resource utilization state so that it is possible to realize the efficient resource utilization. Moreover, the actual transmission timings of the mobile terminals are distributed on a basis of the average transmission interval notified from the base station, so that it is possible to reduce the transmission collisions of the uplink packets and improve the capacity.

Namely, the mobile terminal side judges the traffic type and transmits the reservation signal in the case of the high priority level or the realtime traffic so as to carry out the resource reservation at the base station, so that the QoS can be supported. Also, in the case of the low priority level or the non-realtime traffic, the processing delay and the overhead can be reduced by not transmitting the reservation signal in advance.

Also, in the case of the non-realtime traffic, it is possible to carry out the packet transmission in accordance with the variations of the resource utilization state, by not reserving the resources, referring to the traffic priority level and determining the packet average transmission interval or transmission rate according to the resource utilization state at each period.

For example, when there are transmission requests for the realtime traffic and the non-realtime traffic, the resource amount according to the reservation signal is determined in advance with respect to the realtime traffic, and when the realtime traffic is less than the reserved amount, the non-realtime packets are transmitted by utilizing the vacant resources, so that the efficient resource utilization can be realized.

Also, the mobile terminal determines the actual transmission timing on a basis of the average transmission interval notified from the base station, so that it is possible to distribute the transmission timings, and it is possible to reduce the transmission collisions of the uplink packets and improve the capacity.

Also, the base station allocates the resources to the low priority level or the non-realtime traffic according to the remaining available resource amount by accounting for the interferences from the other cells and the resource amount reserved for the high priority level or the realtime traffic, so that it is possible to realize the efficient utilization of the radio resources while accounting for the QoS support.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A communication control method for mobile communications in which packet communications are carried out between a mobile terminal and a base station, comprising the steps of:
   (a) judging a priority level of a traffic and judging a type of the traffic, at the mobile terminal;
   (b) generating, at the mobile terminal, a reservation signal for a transmission request only when the mobile terminal judges, at the step (a), that the type of the traffic is a high priority level or a realtime type;
   (c) transmitting the reservation signal from the mobile terminal to the base station when the mobile terminal generates the reservation signal at the step (b);
   (d) determining, at the base station, a resource amount to be reserved for packet transmission according to a resource utilization state and the reservation signal for the traffic of the high priority level or the realtime type when the base station receives the reservation signal from the mobile terminal;
   (e) determining, at the base station, an average transmission interval or a transmission rate for the traffic of a non-high priority level or a non-realtime type according to margins in remaining resources when the base station does not receive the reservation signal from the mobile terminal;
   (f) notifying the average transmission interval or the transmission rate determined by the step (e) from the base station to the mobile terminal when the base station determines the average transmission interval or the transmission rate; and
   (g) determining, at the mobile terminal, a transmission timing for packet transmission according to the average transmission interval or the transmission rate notified at the step (f), when the mobile terminal judges, at the step (a), that the type of the traffic is the non-high priority level or the non-realtime type.

2. The communication control method of claim 1, wherein the mobile terminal at the step (c) transmits the reservation signal that contains a QoS request of an application recognized at the mobile terminal, and the base station at the steps (c) and (d) checks a current resource utilization state and determines the resource amount to be allocated to a realtime traffic according to the current resource utilization state and the QoS request contained in the reservation signal when a traffic type of the application is realtime, or determines the average transmission interval or transmission rate when a traffic type of the application is non-realtime.

3. The communication control method of claim 1, wherein the base station at the step (d) obtains the resource utilization state by measuring an uplink interference power level or a rate of the uplink interference power level and an uplink tolerable interference power level.

4. The communication control method of claim 1, wherein the base station at the steps (c) and (d) allocates resources to a realtime traffic whenever the transmission request occurs, and determines the average transmission interval or transmission rate for a non-realtime traffic is determined at each prescribed period according to a total available resource amount based on the resource utilization state in a past prescribed period of time.

5. The communication control method of claim 1, further comprising the step of determining a number of packets to be transmitted per unit time according to a transmission rate of a traffic type notified from the base station, at the mobile terminal.

6. The communication control method of claim 1, further comprising the step of calculating an actual transmission timing according to the average transmission interval of a traffic type notified from the base station and a predetermined distribution, at the mobile terminal.

7. The communication control method of claim 6, further comprising the step of updating the actual transmission timing for not yet transmitted packets of a non-realtime traffic, according to the average transmission interval that is periodically notified from the base station.

8. A communication control system for mobile communications in which packet communications are carried out between a mobile terminal and a base station, the mobile terminal comprising:
   a priority level judging unit configured to judge a priority level of a traffic and to judge a type of the traffic;
   a reservation signal generation unit configured to generate a reservation signal for a transmission request to the base station only when the priority level judging unit judges that the type of the traffic is a high priority level or a realtime type; and
   a reservation signal transmission unit configured to transmit the reservation signal generated by the reservation signal generation unit to the base station when the reservation signal generation unit generates the reservation signal,
   the base station comprising:
   a resource determination unit configured to determine a resource amount to be reserved for packet transmission according to a resource utilization state and the reservation signal for the traffic of the high priority level or the realtime type when the base station receives the reservation signal from the mobile terminal, and to determine an average transmission interval or a transmission rate for the traffic of a non-high priority level or a non-realtime type according to margins in remaining resources when the base station does not receive the reservation signal from the mobile terminal; and a notification information control unit configured to notify the average transmission interval or the transmission rate determined by the resource determination unit to the mobile terminal when the resource determination unit determines the average transmission interval or the transmission rate;

the mobile terminal further comprising a transmission timing determining unit configured to determine a transmission timing for packet transmission according to the average transmission interval or the transmission rate notified by the base station when the priority level judging unit judges that the type of the traffic is the non-high priority level or the non-realtime type.

9. The communication control system of claim 8, further comprising a vacant resource checking unit configured to check a current resource utilization state at the base station, wherein the reservation signal generation unit transmits the reservation signal that contains a QoS request of an application recognized at the mobile terminal, and the resource determination unit determines the resource amount to be allocated to a realtime traffic according to the current resource utilization state and the QoS request contained in the reservation signal when a traffic type of the application is realtime, or determines the average transmission interval or transmission rate when a traffic type of the application is non-realtime.

10. The communication control system of claim 8, wherein the resource determination unit obtains the resource utilization state by measuring an uplink interference power level or a rate of the uplink interference power level and an uplink tolerable interference power level.

11. The communication control system of claim 8, wherein the resource determination unit also allocates resources to a realtime traffic whenever the transmission request occurs, and determines the average transmission interval or transmission rate for a non-realtime traffic is determined at each prescribed period according to a total available resource amount based on the resource utilization state in a past prescribed period of time.

12. The communication control system of claim 8, further comprising a unit configured to determine a number of packets to be transmitted per unit time according to a transmission rate of a traffic type notified from the base station, at the mobile terminal.

13. The communication control system of claim 8, further comprising the transmission timing determination unit configured to calculate an actual transmission timing according to the average transmission interval of a traffic type notified from the base station and a predetermined distribution, at the mobile terminal.

14. The communication control system of claim 13, wherein the transmission timing determination unit also updates the actual transmission timing for not yet transmitted packets of a non-realtime traffic, according to the average transmission interval that is periodically notified from the base station.

* * * * *